United States Patent
Taniguchi et al.

(10) Patent No.: US 12,479,119 B2
(45) Date of Patent: Nov. 25, 2025

(54) WORKING MACHINE

(71) Applicant: Makita Corporation, Anjo (JP)

(72) Inventors: Koki Taniguchi, Anjo (JP); Sho Tsuda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 414 days.

(21) Appl. No.: 18/093,209

(22) Filed: Jan. 4, 2023

(65) Prior Publication Data

US 2023/0219247 A1 Jul. 13, 2023

(30) Foreign Application Priority Data

Jan. 7, 2022 (JP) .................. 2022-001692

(51) Int. Cl.
  *B26B 29/00* (2006.01)
  *B25F 5/02* (2006.01)
  *B23D 45/16* (2006.01)
  *B28D 1/22* (2006.01)
  *B28D 1/24* (2006.01)

(52) U.S. Cl.
  CPC ............... *B26B 29/00* (2013.01); *B25F 5/02* (2013.01); *B23D 45/16* (2013.01); *B28D 1/228* (2013.01); *B28D 1/24* (2013.01)

(58) Field of Classification Search
  CPC .......... B28D 1/24; B28D 1/228; B23D 45/16; B25F 5/02; B26B 29/00
  See application file for complete search history.

(56) References Cited

U.S. PATENT DOCUMENTS

| | | | | |
|---|---|---|---|---|
| 3,701,369 A | * | 10/1972 | Gronke | B27G 19/04 30/391 |
| 5,730,561 A | * | 3/1998 | Wambeke | B23D 57/0084 30/390 |
| 6,378,219 B1 | * | 4/2002 | Hatlee | B27G 19/04 30/286 |
| 2008/0168667 A1 | * | 7/2008 | Spinato | B23D 45/003 30/276 |

FOREIGN PATENT DOCUMENTS

JP 2015-164769 A 9/2015

* cited by examiner

*Primary Examiner* — Liang Dong
(74) *Attorney, Agent, or Firm* — Sughrue Mion, PLLC

(57) ABSTRACT

A working machine may include: an output shaft; a rotary blade attached to the output shaft; a prime mover configured to rotate the output shaft; a housing that houses the prime mover and rotatably supports the output shaft; and a blade cover attached to the housing. The sidewall of the blade cover may include a first stopper and a second stopper. The facing portion of the housing may include a first stopper receiver and a second stopper receiver. When the blade cover is pivoted in a first pivot direction of the blade cover, the first stopper may contact the first stopper receiver. When the blade cover is further pivoted in the first pivot direction from a state where the first stopper is in contact with the first stopper receiver, the second stopper may contact the second stopper receiver.

14 Claims, 9 Drawing Sheets

FIG. 5
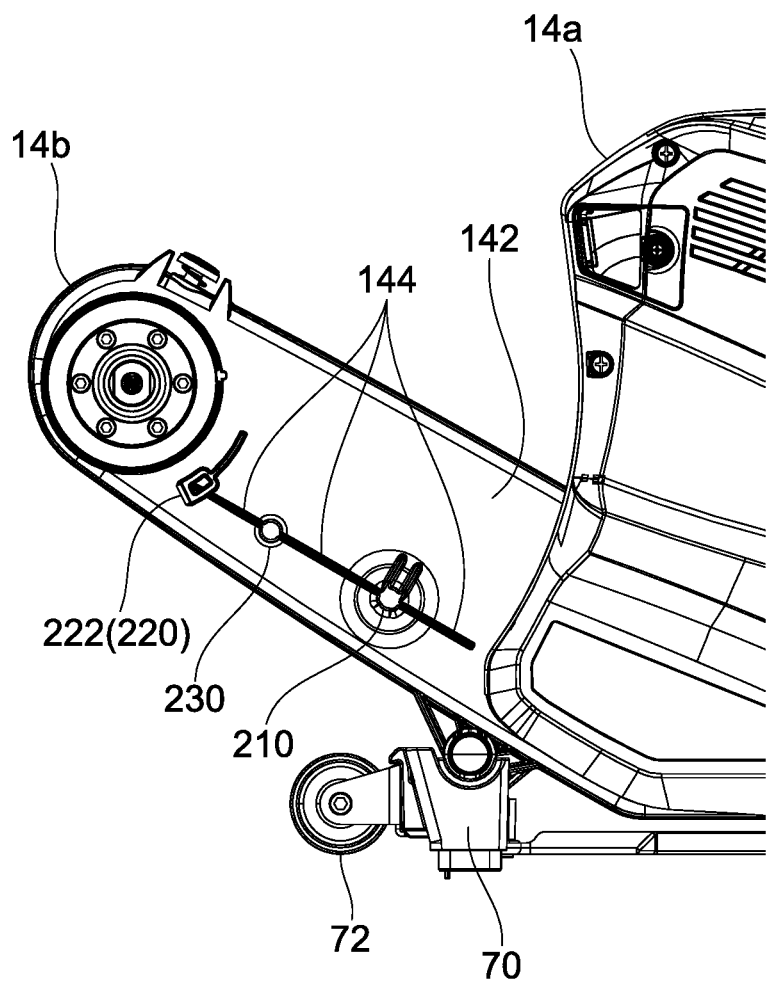
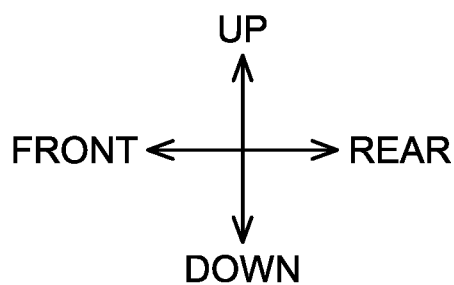

WORKING MACHINE

CROSS-REFERENCE TO RELATED APPLICATION

This application claims priority to Japanese Patent Application No. 2022-1692, filed on Jan. 7, 2022, the entire contents of which are incorporated herein by reference.

TECHNICAL FIELD

The technique disclosed herein relates to a working machine.

BACKGROUND

Japanese Patent Application Publication No. 2015-164769 describes a working machine including an output shaft; a rotary blade attached to the output shaft; a prime mover configured to rotate the output shaft; a housing that houses the prime mover, and rotatably supports the output shaft; and a blade cover attached to the housing such that the blade cover is pivotable with respect to the housing about a pivot axis substantially coincident with a rotation axis of the output shaft. The blade cover comprises a sidewall covering at least a part of a side surface of the rotary blade. The housing includes a facing portion that faces a side surface of the sidewall that is opposite to a side surface of the sidewall that faces the side surface of the rotary blade. The sidewall includes a first stopper. The facing portion includes a first stopper receiver. When the blade cover is pivoted in one of pivot directions of the blade cover, the first stopper contacts the first stopper receiver at a first contact position from an upstream side of the one of the pivot directions.

SUMMARY

In the working machine of Japanese Patent Application Publication No. 2015-164769, the first stopper contacts the first stopper receiver from the upstream side of the one of the pivot directions, by which the blade cover is suppressed from over-pivoting in the one of the pivot directions of the blade cover. With such a working machine, even when the first stopper is in contact with the first stopper receiver, the blade cover may further be pivoted in the one of the pivot directions due to, for example, the first stopper receiver riding up on the first stopper. With the working machine of Japanese Patent Application Publication No. 2015-164769, when the blade cover is further pivoted in the one of the pivot directions from the state in which the first stopper is in contact with the first stopper receiver, the blade cover cannot be suppressed from over-pivoting. The present disclosure provides a technique capable of suitably suppressing a blade cover from over-pivoting.

A working machine disclosed herein may comprise: an output shaft; a rotary blade attached to the output shaft; a prime mover configured to rotate the output shaft; a housing that houses the prime mover, and rotatably supports the output shaft; and a blade cover attached to the housing such that the blade cover is pivotable with respect to the housing about a pivot axis substantially coincident with a rotation axis of the output shaft. The blade cover may comprise a sidewall covering at least a part of a side surface of the rotary blade. The housing may comprise a facing portion that faces a side surface of the sidewall that is opposite to a side surface of the sidewall that faces the side surface of the rotary blade. The sidewall may comprise a first stopper and a second stopper. The facing portion may comprise a first stopper receiver and a second stopper receiver. When the blade cover is pivoted in a first pivot direction of the blade cover, the first stopper may contact the first stopper receiver at a first contact position from an upstream side of the first pivot direction. When the blade cover is further pivoted in the first pivot direction from a state where the first stopper is in contact with the first stopper receiver, the second stopper may contact the second stopper receiver at a second contact position from the upstream side of the first pivot direction.

According to the above configuration, the first stopper suppresses the blade cover from over-pivoting in the first pivot direction by contacting the first stopper receiver. Moreover, according to the above configuration, when the blade cover is further pivoted in the first pivot direction due to, for example, the first stopper receiver riding up on the first stopper, the second stopper comes into contact with the second stopper receiver. Consequently, the blade cover can be suppressed from over-pivoting in the first pivot direction by these two levels of preventive measures. According to the above configuration, the blade cover can suitably be suppressed from over-pivoting.

BRIEF DESCRIPTION OF DRAWINGS

FIG. 5 is an enlarged view of a facing portion 142 of a blade arm 14b included in the power cutter 10 of the embodiment viewed from the left side.

DETAILED DESCRIPTION

Figure 1:
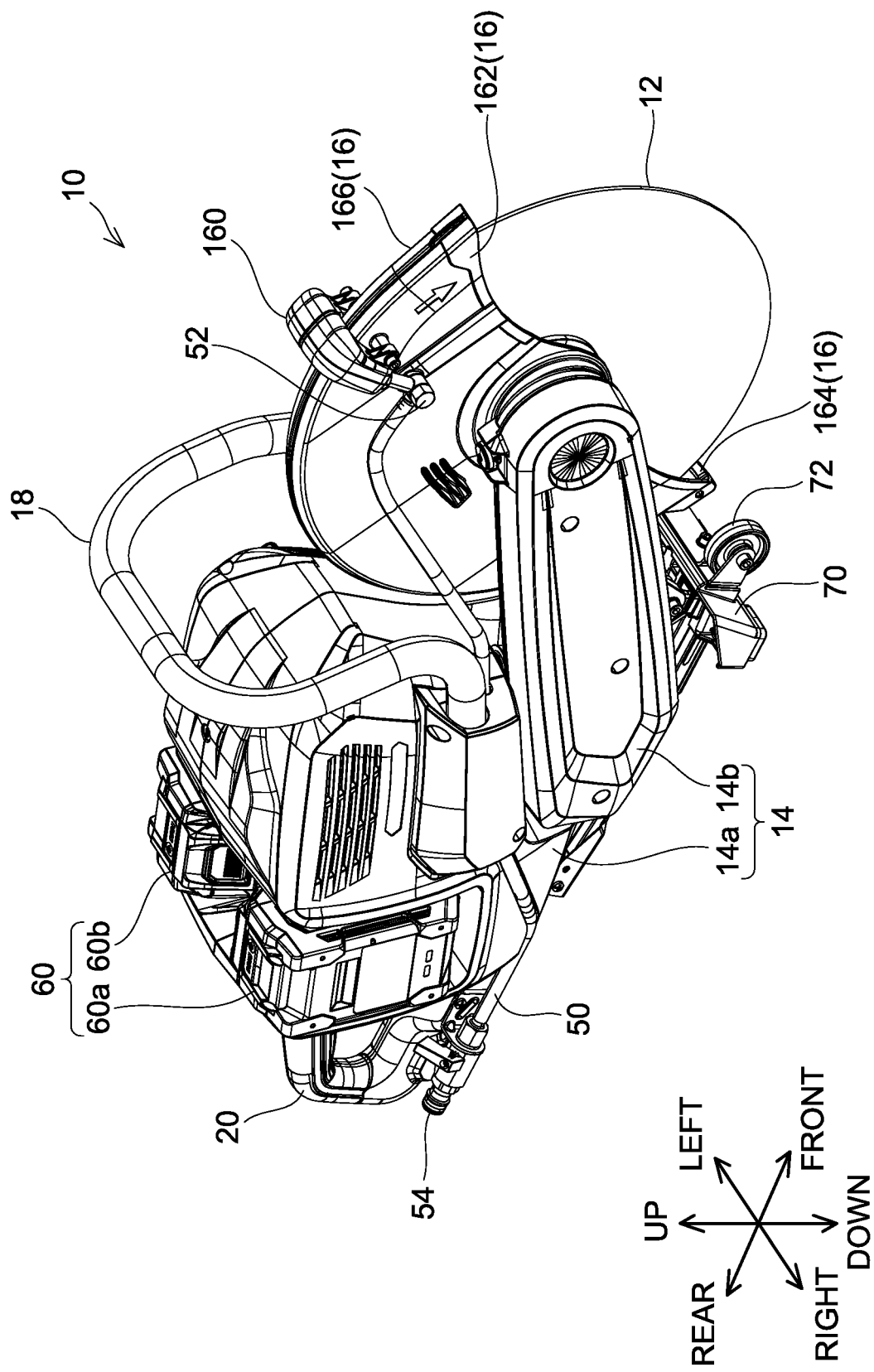
FIG. 1 is a perspective view of an entirety of a power cutter 10 of an embodiment viewed from the front right upper side.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved working machines as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, in the state where the first stopper is in contact with the first stopper receiver, an angle formed by a line connecting the second stopper and the pivot axis and a line connecting the second stopper receiver and the pivot axis may be within a range from 0° to 2°.

If the blade cover is pivoted to a great extent between the state where the first stopper is in contact with the first stopper receiver and the state where the second stopper contacts the second stopper receiver, the blade cover may not suitably be suppressed from over-pivoting. According to the above configuration, the angle formed by the line connecting the second stopper and the pivot axis and the line connecting the second stopper receiver and the pivot axis may be within the range from 0° to 2°. Consequently, the second stopper comes into contact with the second stopper receiver without the blade cover being pivoted to a great extent from the state where the first stopper is in contact with the first stopper receiver. According to the above configuration, the blade cover can more suitably be suppressed from over-pivoting.

In one or more embodiments, the first contact position and the second contact position may be offset from each other in a radial direction of the pivot axis.

If the first contact position and the second contact position are not offset from each other in the radial direction of the pivot axis, the first stopper receiver and the second stopper receiver disposed on the facing portion would at least partially overlap each other in the circumferential direction of the pivot axis. According to the above configuration, the first stopper receiver and the second stopper receiver can be arranged without the receivers overlapping each other in the circumferential direction of the pivot axis. Consequently, the facing portion on which the first stopper receiver and the second stopper receiver are disposed can be downsized in the circumferential direction of the pivot axis.

In one or more embodiments, the first contact position may be offset radially outward from the second contact position.

In general, the blade cover is attached to the housing in the vicinity of the pivot axis. In this case, when the first stopper receiver rides up on the first stopper, a distance between the facing portion and the sidewall becomes larger at their portions farther away from the pivot axis. If a distance between the second stopper and the second stopper receiver becomes large in this state, there is a risk that the second stopper and the second stopper receiver do not contact each other and the blade cover is not suppressed from over-pivoting. According to the above configuration, the second contact position is offset radially inward from the first contact position, by which the distance between the second stopper and the second stopper receiver is prevented from becoming larger even when the first stopper receiver rides up on the first stopper. Consequently, it is ensured that the second stopper contacts the second stopper receiver with greater assurance when the first stopper receiver rides up on the first stopper. According to the above configuration, it is ensured that the blade cover can be suppressed from over-pivoting with greater assurance.

In one or more embodiments, the sidewall may further comprise a third stopper. The facing portion may further comprise a third stopper receiver. When the blade cover is pivoted in a second pivot direction which is opposite to the first pivot direction, the third stopper may contact the third stopper receiver at a third contact position from an upstream side of the second pivot direction.

According to the above configuration, the third stopper suppresses the blade cover from over-pivoting in the second direction of the pivot directions by contacting the third stopper receiver. According to the above configuration, the blade cover can be suppressed not only from over-pivoting in the first pivot direction but also from over-pivoting in the second pivot direction.

In one or more embodiments, the output shaft may be configured to be rotated in a predetermined rotation direction about the rotation axis. The first pivot direction may correspond to the predetermined rotation direction of the output shaft. The second pivot direction may correspond to a reverse rotation direction which is opposite to the predetermined rotation direction of the output shaft.

For example, the situation in which torque which is large enough for the first stopper receiver to ride up on the first stopper is generated at the blade cover may for example be a situation in which torque of the rotary blade is transmitted to the blade cover via a foreign object that adversely entered between the rotary blade and the blade cover. In this case, torque is generated at the blade cover in a direction, rotating the blade cover in a direction corresponding to the forward rotation direction of the rotary blade. According to the above configuration, the first stopper and the second stopper can suppress the blade cover from over-pivoting in the direction which corresponds to the forward rotation direction of the rotary blade by these two levels of preventive measures. According to the above configuration, when the torque of the rotary blade is transmitted to the blade cover, the blade cover can more suitably be suppressed from over-pivoting.

In one or more embodiments, at least one of the first stopper, the second stopper, and the third stopper may be integrated with the sidewall.

In manufacturing the working machine, there is a case in which the number of parts of the blade cover needs to be reduced. According to the above configuration, as compared to the case in which the first stopper, the second stopper and the third stopper are separately attached to the sidewall, the number of parts of the blade cover can be reduced.

In one or more embodiments, at least one of the first stopper, the second stopper, and the third stopper may be separate from the sidewall.

In general, when each of the first stopper, the second stopper and the third stopper is integrated with the sidewall, the same material used for the sidewall is used for the first stopper, the second stopper and the third stopper. Here, there is a case in which the material different from the one used for the sidewall needs to be used for the first stopper, the second stopper and/or the third stopper. In the above configuration, at least one of the first stopper, the second stopper and the third stopper can be formed using a material different from the one used for the sidewall.

In one or more embodiments, at least one of the first stopper receiver, the second stopper receiver, and the third stopper receiver may be integrated with the facing portion.

In manufacturing processes of the working machine, there is a case in which the number of parts of the housing needs to be reduced. According to the above configuration, as compared to the case in which the first stopper receiver, the second stopper receiver and the third stopper receiver are separately attached to the facing portion, the number of parts of the housing can be reduced.

In one or more embodiments, at least one of the first stopper receiver, the second stopper receiver, and the third stopper receiver may be separate from the facing portion.

In general, when each of the first stopper, the second stopper and the third stopper is integrated with the facing portion, the same material used for the facing portion is used for the first stopper, the second stopper and the third stopper. Here, there is a case in which a material different from the one used for the facing portion needs to be used for the first stopper receiver, the second stopper receiver and/or the third stopper receiver. According to the above configuration, at least one of the first stopper receiver, the second stopper receiver and the third stopper receiver can be formed using the material different from the one used for the facing portion.

In one or more embodiments, the working machine may further comprise: an output pulley fixed to the output shaft; an input shaft rotatably supported by the housing; an input pulley fixed to the input shaft; and a transmission belt wrapped around the input pulley and the output pulley. The prime mover may be configured to rotate the output shaft by rotating the input shaft. The working machine may work as a power cutter.

In the power cutter configured to rotate the rotary blade with relatively large torque among the working machine, it is relatively likely that torque large enough for the first stopper receiver to ride up on the first stopper is generated at the blade cover. According to the above configuration, the blade cover can suitably be suppressed from over-pivoting in the power cutter.

Embodiment (Configuration of Power Cutter 10)

As illustrated in FIG. 1, a power cutter 10 which is an example of a working machine is a handheld power tool and is primarily used to cut an object such as stone and steel. The power cutter 10 includes a rotary blade 12, a housing body 14a, a blade arm 14b, a blade cover 16, a front handle 18, a rear handle 20, a water supply hose 50, a plurality of battery packs 60 and a guide roller 70. In the present disclosure, the housing body 14a and the blade arm 14b may collectively be referred to as "housing 14".

Figure 2:
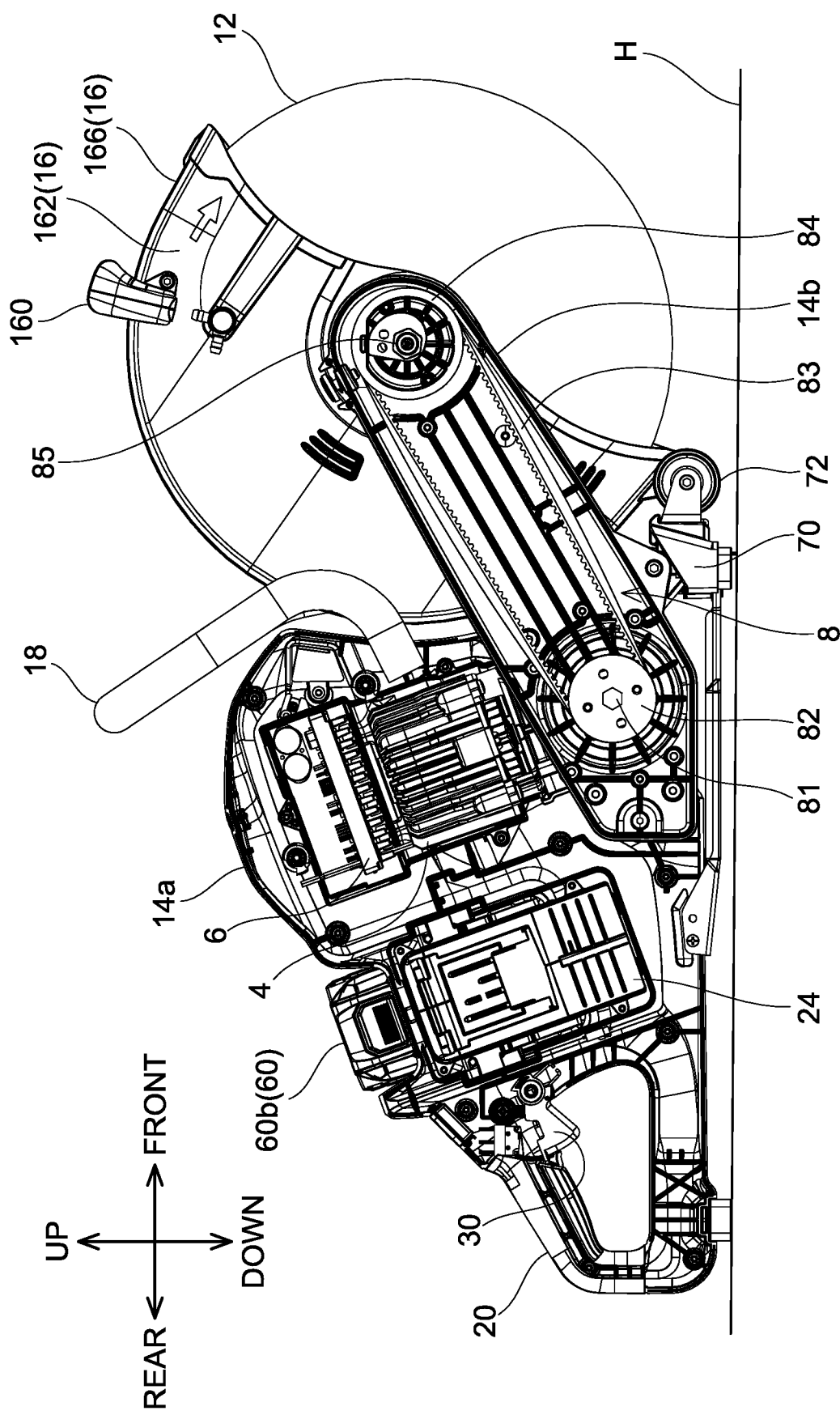
FIG. 2 is a side view of a structure of the power cutter 10 of the embodiment within the housing 14 viewed from the right side.

As illustrated in FIG. 2, the power cutter 10 further includes an electric motor 4, a control board 6, a battery interface 24 and a power transmission part 8. The electric motor 4 is an example of a prime mover.

(Rotary Blade 12)

The rotary blade 12 is a blade having a disk shape and it has a plurality of blade edges or grinding stones at its circumferential end. The rotary blade 12 may for example be a diamond wheel. The rotary blade 12 is a so-called consumable item, thus it is detachably attached to the blade arm 14b. A rotation axis of the rotary blade 12 extends in a direction orthogonal to the longitudinal direction of the blade arm 14b.

Here, in the present disclosure, in the state where the power cutter 10 is placed on the placement surface H, a direction orthogonal to the placement surface H is defined as the up-down direction, a direction toward the power cutter 10 from the placement surface H is defined as an upward direction, and a direction from the power cutter 10 toward the placement surface H is defined as a downward direction. Moreover, a direction orthogonal to the up-down direction and along which the rotation axis of the rotary blade 12 extends is defined as the left-right direction. A direction perpendicular to the up-down direction and the left-right direction is defined as the front-rear direction, the direction extending from the rear handle 20 to the front handle 18 is defined as a frontward direction and a direction extending from the front handle 18 to the rear handle 20 is defined as a rearward direction.

(Guide Roller 70)

The guide roller 70 is attached to a lower portion of the housing 14. The guide roller 70 includes a pair of left and right wheels 72 (see FIG. 1). The pair of left and right wheels 72 is arranged such that the wheels 72 are not in contact with the placement surface H when the power cutter 10 is placed on the placement surface H. The user who uses the power cutter 10 can stably move the rotary blade 12 forward and rearward relative to an object to be cut by performing work with the pair of left and right wheels 72 being in contact with a surface (e.g., the placement surface H).

(Water Supply Hose 50)

As illustrated in FIG. 1, the water supply hose 50 is disposed at the right side of the power cutter 10. The distal end of the water supply hose 50 is attached to a first sidewall 162 (to be described later) of the blade cover 16 via the plug 52. The proximal end of the water supply hose 50 is attached to a lower portion of the rear handle 20. A water supply connector 54 is disposed at the proximal end of the water supply hose 50. The water supply connector 54 is held by the housing body 14a, and can be connected to an external water source such as a tap faucet via a hose (illustration omitted). Thus, the water supply hose 50 can supply water into the blade cover 16.

(Front Handle 18 and Rear Handle 20)

The front handle 18 and the rear handle 20 are disposed on the housing body 14a. The front handle 18 extends rightward and leftward from above the housing body 14a. One end of the front handle 18 is attached to the vicinity of the center of the right side surface of the housing body 14a and the other end is attached to a lower portion of the left side surface of the housing body 14a. The rear handle 20 extends rearward from the housing body 14a. The user usually holds the power cutter 10 by grasping the front handle 18 with his/her left hand and grasping the rear handle 20 with his/her right hand. At this time, the user can adjust a posture of the power cutter 10 by changing a position at which the user grasps the front handle 18.

Figure 3:
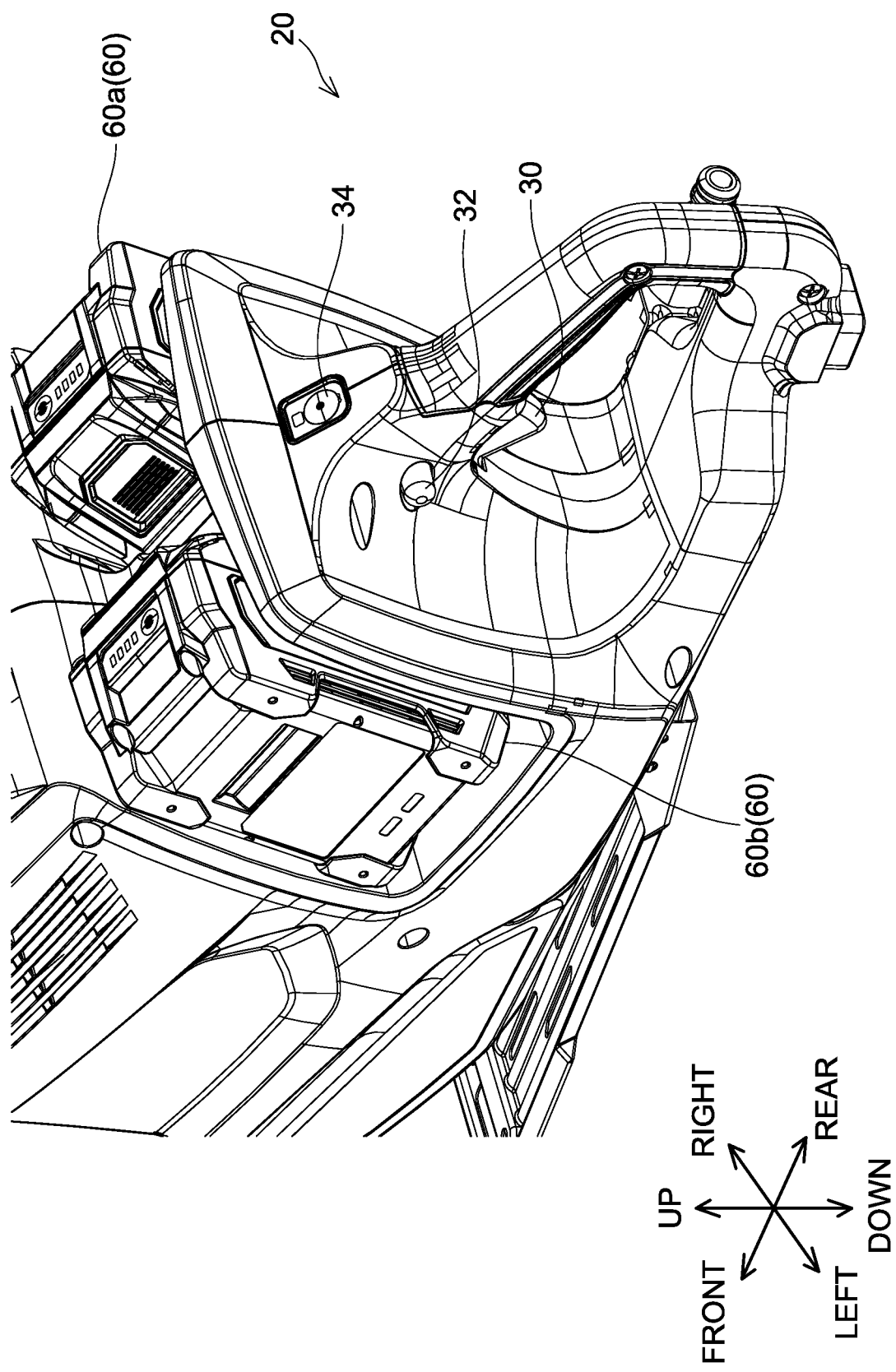
FIG. 3 is an enlarged view of a rear handle 20 included in the power cutter 10 of the embodiment viewed from the rear upper left side.

As illustrated in FIG. 3, the rear handle 20 includes a main switch 30 which the user can operate with his/her finger of the hand grasping the rear handle 20. In the present embodiment, when the user operates the main switch 30, the control board 6 (see FIG. 2) starts supplying power to the electric motor 4 (see FIG. 2) and when the operation on the main switch 30 is stopped, the control board 6 stops supplying the power to the electric motor 4. The details will be described later, however, when the power is supplied to the electric motor 4, the rotary blade 12 is rotated. In other words, the power cutter 10 is configured to rotate the rotary blade 12 only when the main switch 30 is being operated.

The rear handle 20 further includes a lock-off switch 32. The lock-off switch 32 is held such that it can slide in the left-right direction relative to the rear handle 20. Although not illustrated, when the lock-off switch 32 is not pushed rightward relative to the rear handle 20, the main switch 30 is in mechanical interference with the lock-off switch 32, by which operation on the main switch 30 is prohibited. When the lock-off switch 32 is pushed rightward relative to the rear handle 20, the main switch 30 is not in mechanical interference with the lock-off switch 32, by which operation on the main switch 30 is allowed.

The rear handle 20 further includes an operation button 34. In the present embodiment, the control board 6 (see FIG. 2) starts or stops the supply of power to lightings (not illustrated) in accordance with operation on the operation button 34. In other words, the operation button 34 is a button to switch the lightings on and off (Plurality of Battery Packs 60 and Battery Interface 24)

As illustrated in FIG. 2, the plurality of battery packs 60 includes at least one secondary battery cell (illustration omitted). The plurality of battery packs 60 is detachably attached to the battery interface 24 disposed on the housing body 14a and can supply power to the electric motor 4.

(Control Board 6)

The control board 6 is housed in the housing body 14a. The control board 6 is electrically connected to the plurality of battery packs 60, and adjusts power supplied from the plurality of battery packs 60 and supplies the same to the electric motor 4. In the present embodiment, since the electric motor 4 is a brushless motor, the control board 6 further includes an inverter circuit (illustration omitted). The inverter circuit electrically connects the plurality of battery packs 60 to the electric motor 4, converts DC power from the plurality of battery packs 60 into three-phase AC power and supplies the same to the electric motor 4. The control board 6 is also electrically connected to the lightings (not illustrated) of the housing 14, and can adjust the power supplied form the plurality of battery packs 60 and supply the same to the lightings.

(Electric Motor 4)

The electric motor 4 is housed in the housing body 14a. The electric motor 4 of the present embodiment is a brushless motor, and the electric motor 4 includes a stator, a rotor, and a motor shaft (illustration omitted). When power is supplied to the electric motor 4, the motor shaft starts to rotate.

(Power Transmission Part 8)

The power transmission part 8 includes an input shaft 81, an output shaft 85, an input pulley 82 fixed to the input shaft 81, an output pulley 84 fixed to the output shaft 85, and a transmission belt 83 wrapped around the input pulley 82 and the output pulley 84.

The input shaft 81 and the input pulley 82 are rotatably supported by the housing 14. The rotation axis of the input shaft 81 and the input pulley 82 is along the left-right direction. Although not illustrated, the input shaft 81 is connected to the motor shaft of the electric motor 4 via for example a speed reducer housed in the housing body 14a. Consequently, the input shaft 81 rotates simultaneously as the motor shaft rotates.

The transmission belt 83 is housed in the blade arm 14b together with the input pulley 82 and the output pulley 84. In the present embodiment, the input pulley 82 and the output pulley 84 are geared pulleys, and the transmission belt 83 is a geared belt. The input pulley 82 and the transmission belt 83 are in mesh with each other. The output pulley 84 and the transmission belt 83 are also in mesh with each other. Consequently, when the input shaft 81 rotates, the output pulley 84 rotates simultaneously via the transmission belt 83 and the input pulley 82 fixed to the input shaft 81.

The output pulley 84 and the output shaft 85 are rotatably supported by the housing 14. The rotation axis of the output pulley 84 and the output shaft 85 is along the left-right direction. The rotary blade 12 is attached to the output shaft 85. Thus, when the output pulley 84 rotates, the rotary blade 12 also rotates simultaneously via the output shaft 85. On this occasion, the rotary blade 12 rotates about the same rotation axis as the output shaft 85.

As described above, the power transmission part 8 transmits power from the electric motor 4 to the rotary blade 12. This enables the electric motor 4 to rotate the rotary blade 12 in the power cutter 10. In the power cutter 10 of the present embodiment, the rotary blade 12 is configured to rotate in a predetermined rotation direction. In the power cutter 10 of the present embodiment, the rotary blade 12 is configured to be rotated clockwise when the power cutter 10 is viewed from the right side.

(Blade Cover 16)

As illustrated in FIG. 1, the blade cover 16 is arranged in the vicinity of the front end of the blade arm 14b, and attached to the blade arm 14b such that the blade cover 16 is pivotable about the rotation axis of the output shaft 85 (see FIG. 2). In other words, the pivot axis A of the blade cover 16 (see FIG. 4) extends in the left-right direction. Hereafter, with respect to the pivot directions of the blade cover 16, the clockwise direction when the power cutter 10 is viewed from the right side is defined as a first direction and the counterclockwise direction when the power cutter 10 is viewed from the right side is defined as a second direction. When the directions are defined as such, the first direction corresponds to a forward rotation direction of the rotary blade 12, and the second direction corresponds to a reverse rotation direction of the rotary blade 12.

In the present embodiment, an elastic member pressed in the left-right direction (not illustrated) is disposed between the blade cover 16 and the blade arm 14b. Consequently, the blade cover 16 can pivot only when the blade cover 16 is pivoted against friction which the elastic member applies to the blade cover 16. A grip 160 to be gripped by the user is disposed at the radially outward side of the blade cover 16. By gripping the grip 160, the user can relatively easily rotate the blade cover 16.

The blade cover 16 includes a first sidewall 162 which partially covers the right side surface of the rotary blade 12, a second sidewall 164 (see FIG. 6) which partially covers the left side surface of the rotary blade 12, and a circumferential wall 166 connecting the first sidewall 162 to the second sidewall 164 and partially covers the outer circumferential edge of the rotary blade 12. In the present embodiment, the first sidewall 162, the second sidewall 164 and the circumferential wall 166 are seamlessly and integrally formed. A magnesium alloy is used for the first sidewall 162, the second sidewall 164 and the circumferential wall 166. The first sidewall 162 and the second sidewall 164 of the present embodiment respectively covers an angular range of 175° or more of the side surfaces of the rotary blade 12. Consequently, the blade cover 16 prevents cutting dust generated by the rotary blade 12 from flying toward the user.

Figure 4:
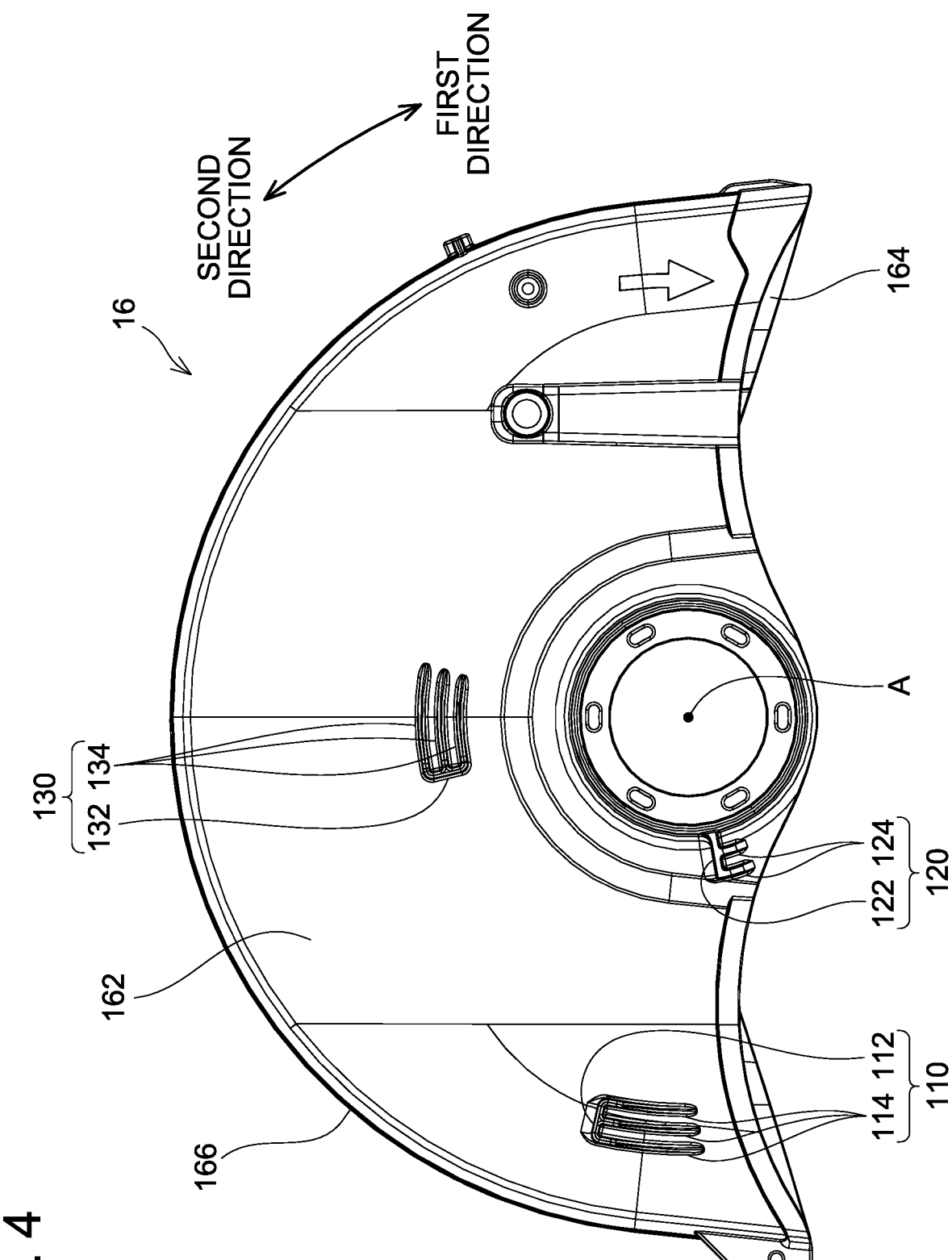
FIG. 4 is an enlarged view of a first sidewall 162 of a blade cover 16 included in the power cutter 10 of the embodiment viewed from the right side.

As illustrated in FIG. 4, the first sidewall 162 includes a first stopper 110, a second stopper 120 and a third stopper 130. In the present embodiment, the first stopper 110, the second stopper 120 and the third stopper 130 are seamlessly and integrally formed with the first sidewall 162. For this reason, as with the first sidewall 162, a magnesium alloy is used for the first stopper 110, the second stopper 120 and the third stopper 130. The first stopper 110 is arranged at a position relatively away from the pivot axis A of the blade cover 16. The second stopper 120 is disposed as close as possible to the pivot axis A as long as attachment of the blade cover 16 to the blade arm 14b and the like is not obstructed. The third stopper 130 is disposed between the first stopper 110 and the second stopper 120 in the radial direction of the pivot axis A.

The first stopper 110 is disposed such that it protrudes rightward from the first sidewall 162. The first stopper 110 includes a first stopper surface 112 substantially perpendicular to the circumferential direction of the pivot axis A on the first direction side. The first stopper 110 further includes first ribs 114 extending in the circumferential direction of the pivot axis A on the second direction side of the first stopper surface 112.

The second stopper 120 is disposed such that it protrudes rightward from the first sidewall 162. The second stopper 120 includes a second stopper surface 122 substantially perpendicular to the circumferential direction of the pivot axis A on the first direction side. The second stopper 120 further includes second ribs 124 extending in the circumferential direction of the pivot axis A on the second direction side of the second stopper surface 122.

The third stopper 130 is disposed such that it protrudes rightward from the first sidewall 162. The third stopper 130 includes a third stopper surface 132 substantially perpendicular to the circumferential direction of the pivot axis A on the second direction side. The third stopper 130 further includes third ribs 134 extending in the circumferential direction of the pivot axis A on the first direction side of the third stopper surface 132.

(Blade Arm 14b)

As illustrated in FIG. 5, the blade arm 14b includes a facing portion 142 which faces the right surface of the first sidewall 162 (see FIG. 4) of the blade cover 16. In the present embodiment, a magnesium alloy is used for the facing portion 142. A second stopper receiver 220, a third stopper receiver 230 and a first stopper receiver 210 are disposed on the facing portion 142 from the front to the rear along the longitudinal direction of the blade arm 14b. A longitudinal rib 144 which is connected to the first stopper receiver 210, the second stopper receiver 220 and the third stopper receiver 230 and extends in the longitudinal direction of the blade arm 14b is further disposed on the facing portion 142. In the present embodiment, the first stopper receiver 210, the second stopper receiver 220, the third stopper receiver 230, and the longitudinal rib 144 are seamlessly and integrally formed. For this reason, as with the facing portion 142, a magnesium alloy is used for the first stopper receiver 210, the second stopper receiver 220, the third stopper receiver 230 and the longitudinal rib 144.

The first stopper receiver 210 is disposed such that it protrudes leftward from the facing portion 142. The first stopper receiver 210 extends along the latitudinal direction of the blade arm 14b.

The second stopper receiver 220 is disposed such that it protrudes leftward from the facing portion 142. The second stopper receiver 220 extends along the circumferential direction of the pivot axis A (see FIG. 4) of the blade cover 16. The second stopper receiver 220 includes a second stopper receiver surface 222 substantially perpendicular to the circumferential direction of the pivot axis A on the second direction side.

The third stopper receiver 230 is disposed such that it protrudes leftward from the facing portion 142. The third stopper receiver 230 has a substantially column shape.

(Over-Pivoting Suppression Mechanism of Blade Cover 16)

Figure 6:
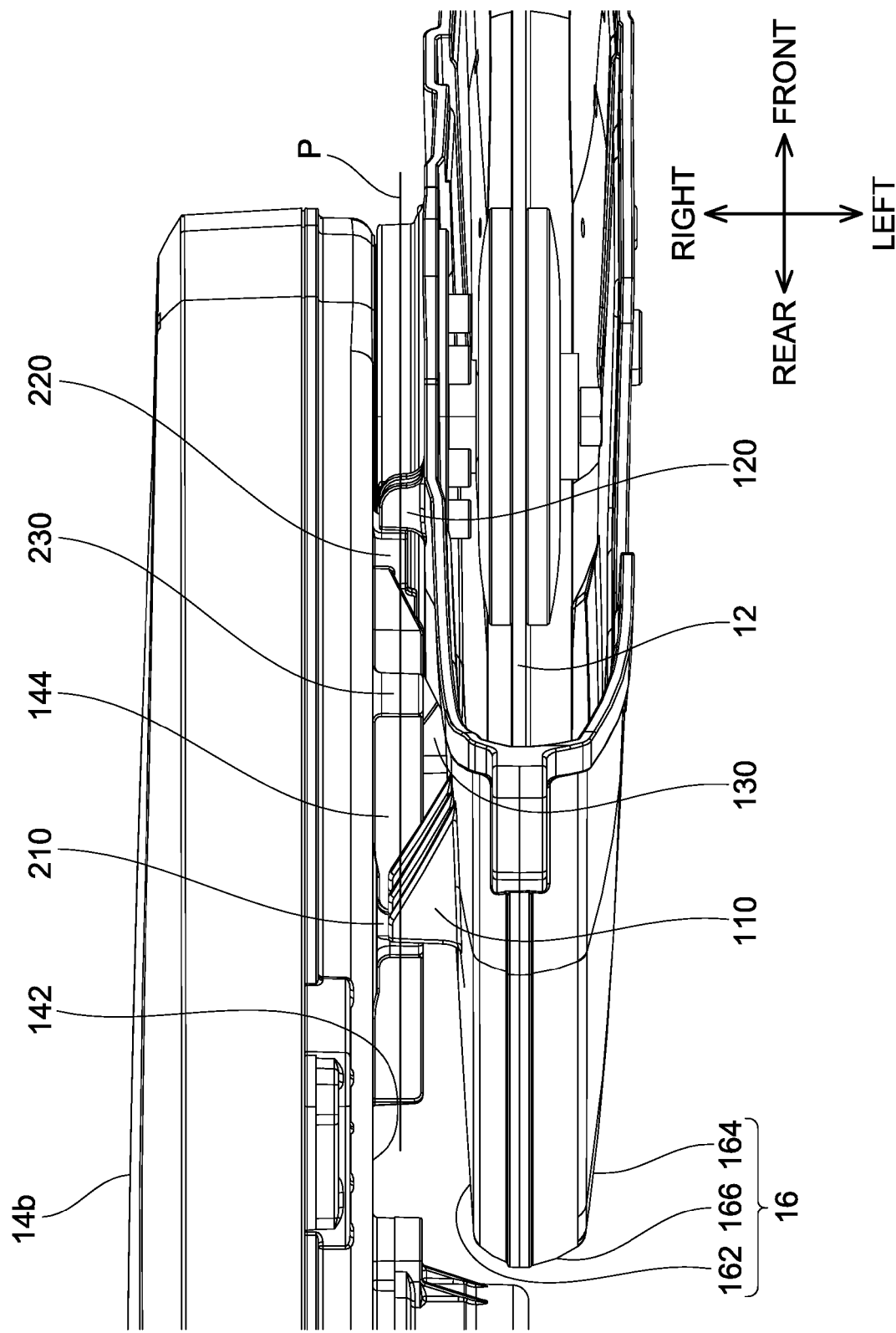
FIG. 6 is an enlarged view of an over-pivoting suppression mechanism of the blade cover 16 of the power cutter 10 of the embodiment viewed from below.

As illustrated in FIG. 6, when the power cutter 10 is viewed from below, the first stopper 110, the second stopper 120, the third stopper 130, the first stopper receiver 210, the second stopper receiver 220, the third stopper receiver 230 and the longitudinal rib 144 are disposed on a reference plane P extending in the front-rear direction and in the up-down direction. Hereafter, explanations will be made using a cross-sectional view on the reference plane P.

(Suppression of Over-Pivoting of Blade Cover 16 in First Direction)

Figure 7:
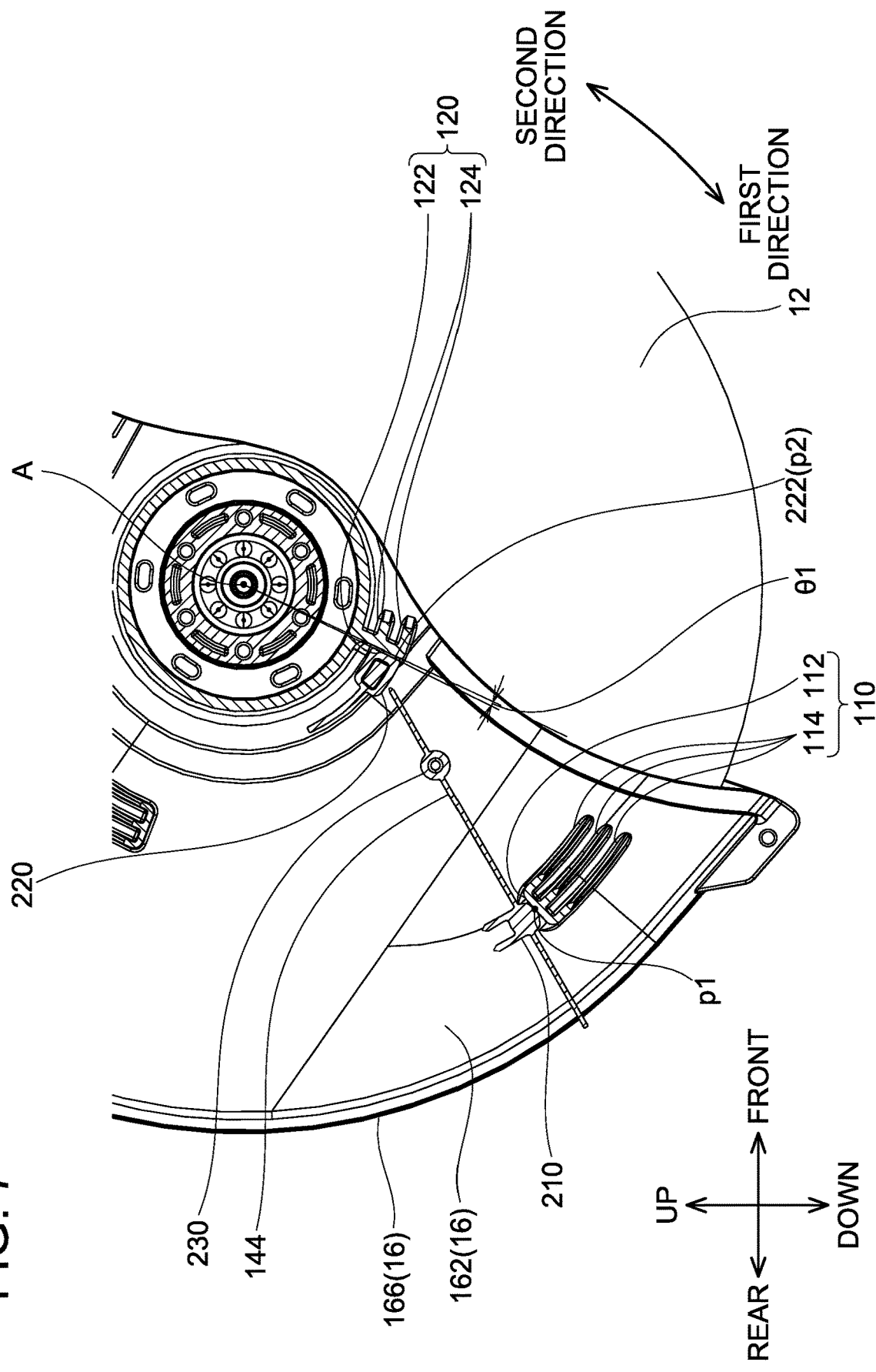
FIG. 7 is a cross-sectional view of the power cutter 10 of the embodiment in the state where a first stopper 110 is in contact with the first stopper receiver 210 from a second direction side on a reference plane P illustrated in FIG. 6, viewed from the right side.

As illustrated in FIG. 7, when the blade cover 16 is pivoted in the first direction, the first stopper 110 contacts the first stopper receiver 210 at a first contact position p1 from the second direction side. In the state where the first stopper 110 is in contact with the first stopper receiver 210, the first stopper 110 and the first stopper receiver 210 applies rection force on each other, by which the blade cover 16 is suppressed from pivoting in the first direction. In the state illustrated in FIG. 7, the second stopper 120 and the second stopper receiver 220 are not in contact with each other.

In the state where the first stopper 110 is in contact with the first stopper receiver 210, an angle θ1 formed by a line connecting the second stopper surface 122 and the pivot axis A and a line connecting the second stopper receiver surface 222 and the pivot axis A is within a range from 0° to 2°. In the present embodiment, in the state where the first stopper 110 is in contact with the first stopper receiver 210, the angle θ1 formed by the line connecting the second stopper surface 122 and the pivot axis A and the line connecting the second stopper receiver surface 222 and the pivot axis A is 1°. Thus, when the blade cover 16 is further pivoted in the first direction from the state where the first stopper 110 is in contact with the first stopper receiver 210, the blade cover 16 pivots only by 1° and then the second stopper surface 122 contacts the second stopper receiver surface 222 from the second direction side. Although not illustrated, in the state where the second stopper 120 is in contact with the second stopper receiver 220 as well, the second stopper 120 and the second stopper receiver 220 applies rection force on each other, by which the blade cover 16 is suppressed from pivoting in the first direction. A position at which the second stopper 120 and the second stopper receiver 220 contacts (a second contact position p2) is a position of the second stopper receiver surface 222. The second contact positions p2 is offset inward from the first contact position p1 in the radial direction of the pivot axis A.

As described above, only the first stopper 110 and the first stopper receiver 210 normally function to suppress the blade cover 16 from over-pivoting in the first direction. The second stopper 120 and the second stopper receiver 220 function as a backup when, for example, the first stopper receiver 210 rides up on the first stopper 110. Thus, the blade cover 16 is suppressed from over-pivoting in the first direction by these two levels of preventive measures.

(Suppression of Over-Pivoting of Blade Cover 16 in Second Direction)

Figure 8:
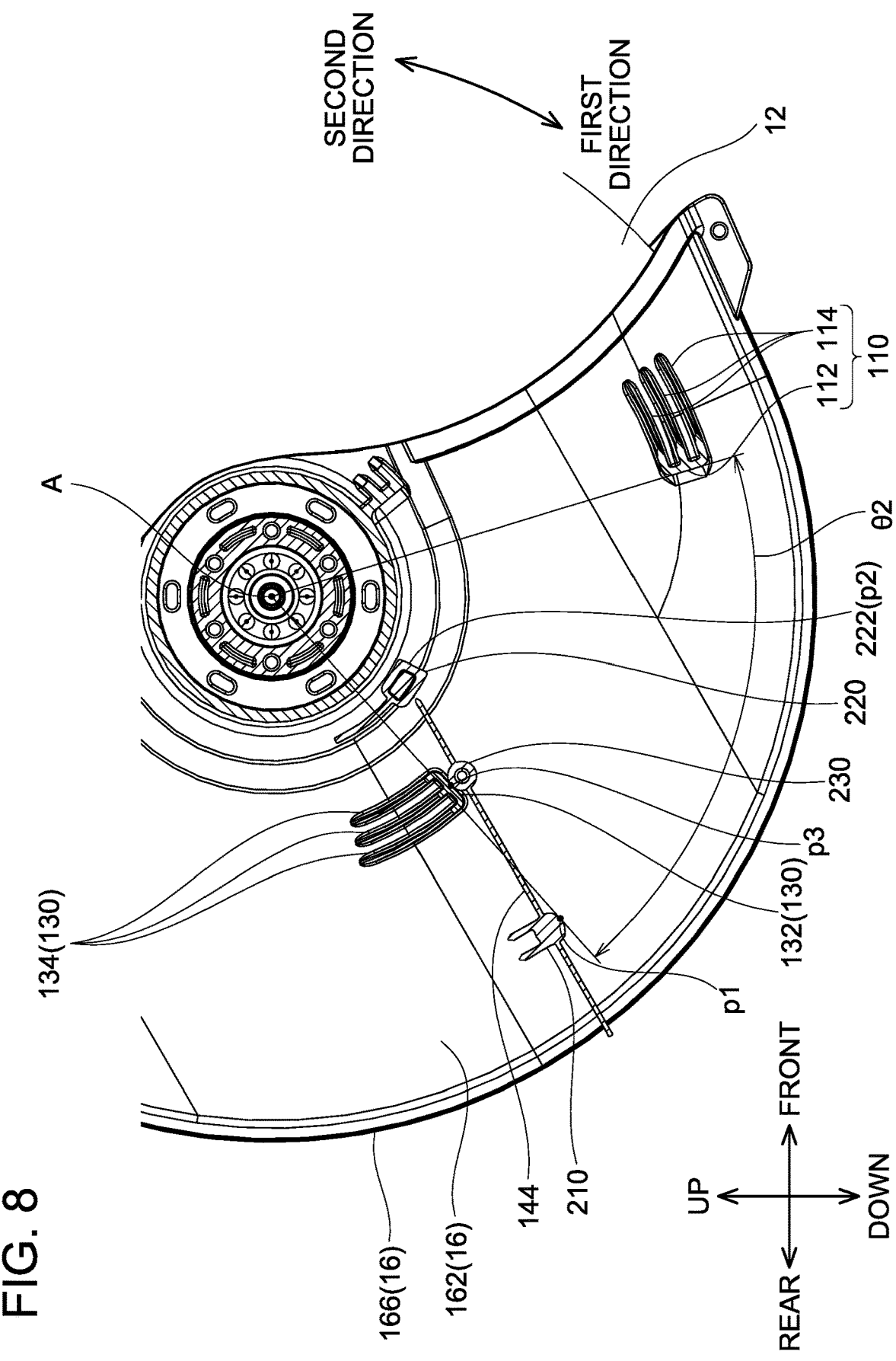
FIG. 8 is a view of the power cutter 10 of the embodiment in the state where a third stopper 130 is in contact with a third stopper receiver 230 from a first direction side on the reference plane P illustrated in FIG. 6, viewed from the right side.

As illustrated in FIG. 8, when the blade cover 16 is pivoted in the second direction, the third stopper 130 contacts the third stopper receiver 230 at a third contact position p3 from the first direction side. The third contact position p3 is offset inward from the first contact position p1 in the radial direction of the pivot axis A, and is offset outward from the second contact position p2 in the radial direction of the pivot axis A. In the state where the third stopper 130 is in contact with the third stopper receiver 230, the third stopper 130 and the third stopper receiver 230 applies rection force on each other, by which the blade cover 16 is suppressed from pivoting in the second direction.

(Movable Area of Blade Cover 16)

In the state where the third stopper 130 is in contact with the third stopper receiver 230, an angle θ2 formed by a line connecting the first stopper surface 112 and the pivot axis A and a line connecting the first contact position p1 and the pivot axis A is 65°. Thus, a movable area of the blade cover 16 is usually restricted within an angular range of 65° by the first stopper 110 and the first stopper receiver 210, and the third stopper 130 and the third stopper receiver 230.

Figure 9:
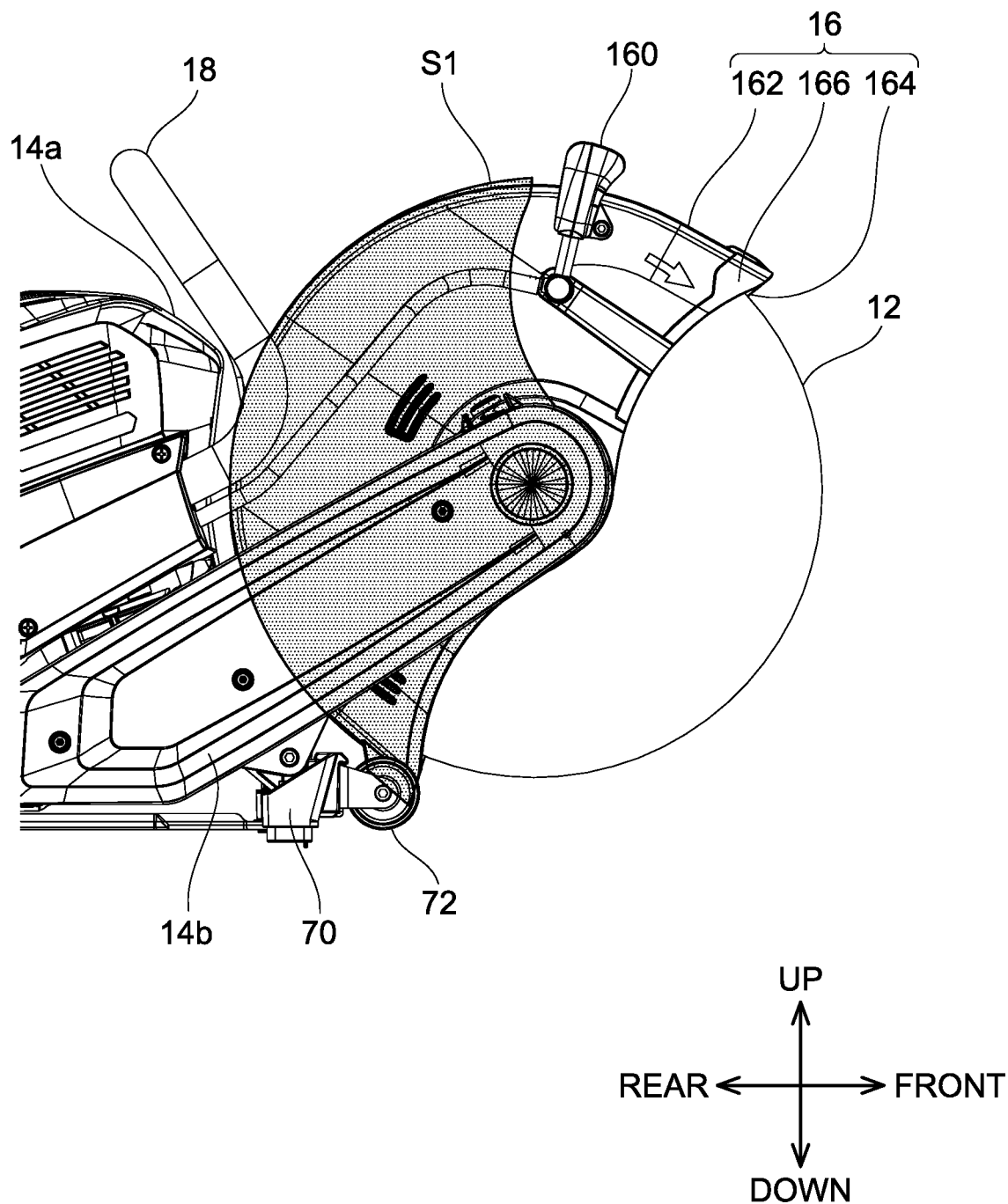
FIG. 9 is a view of the power cutter 10 of the embodiment illustrating a predetermined area Si of the rotary blade 12 which is covered by the blade cover 16 when the blade cover 16 is arbitrarily pivoted within its pivotable range.

As illustrated in FIG. 9, the blade cover 16 is configured such that it is ensured the blade cover 16 covers a predetermined area 51 of the rotary blade 12 as long as the blade cover 16 is pivoted within the above movable area. In the present embodiment, the predetermined area 51 is an area rearward of the rotary blade 12 and is an angular range of about 110° of the entire circumference of the rotary blade 12. Since the user works standing behind the rotary blade 12, the blade cover 16 of the present embodiment can suitably prevent cutting dust from flying toward the user.

(Variants)

In the above embodiment, the power cutter 10 was explained as an example of the working machine. In another variant, the working machine may be a working machine other than the power cutter 10. In another embodiment, the working machine may for example be an electric circular saw or a grinder.

In the above embodiment, the configuration in which the electric motor 4 is included as an example of a prime mover was described. In another variant, the prime mover may be a prime mover other than the electric motor 4. For example, the prime mover may be an engine.

In the above embodiment, the configuration in which the electric motor 4 is a brushless motor was described. In another embodiment, the electric motor 4 may be a motor other than a brushless motor. For example, the electric motor 4 may be a brush motor.

In the above embodiment, the configuration in which the motor shaft of the electric motor 4 is connected to the input shaft 81 via a speed reducer or the like was described. In another embodiment, the motor shaft of the electric motor 4 may be connected to the input shaft 81 without using the speed reducer or the like. In other words, the motor shaft of the electric motor 4 may function as the input shaft 81.

In the above embodiment, the configuration in which the input pulley 82 and the output pulley 84 are geared pulleys, the transmission belt 83 is a geared belt, and power is transmitted between the input pulley 82, the transmission belt 83 and the output pulley 84 mainly by meshing of the respective gears was described. In another embodiment, the input pulley 82 and the output pulley 84 may be pulleys other than geared pulleys, and the transmission belt 83 may be a belt other than a geared belt. For example, the input pulley 82 and the output pulley 84 may be pulleys including V-shaped grooves, and the transmission belt 83 may be a flat belt or a V belt. In this case, power is transmitted between the input pulley 82, the transmission belt 83 and the output pulley 84 mainly by friction between these members.

In the above embodiment, the configuration in which the working machine (the power cutter 10) includes the plurality of battery packs 60 and power is supplied from the plurality of battery packs 60 to the electric motor 4 was described. In another embodiment, the working machine (the power cutter 10) may include a power cable connected to an external power source instead of the plurality of battery packs 60, and power may be supplied from the external power source to the electric motor 4 via the power cable. In yet another embodiment, the working machine (the power cutter 10) may include one battery pack instead of the plurality of battery packs 60.

In the above embodiment, the configuration in which the plurality of battery packs 60 is two battery packs was described. In another embodiment, the plurality of battery packs 60 may be three or more battery packs. For example, the plurality of battery packs 60 may be four battery packs.

In the above embodiment, the configuration in which the rotary blade 12 is rotated clockwise when the power cutter 10 is viewed from the right side was described. In another embodiment, the rotary blade 12 may be configured to be rotated counterclockwise when the power cutter 10 is viewed from the right side.

In the above embodiment, the configuration in which the rotary blade 12 is rotated in the predetermined rotation direction was described. In another embodiment, the user may select a rotation direction of the rotary blade 12, and the rotary blade 12 may be configured to be rotated in the rotation direction selected by the user.

In the above embodiment, the configuration in which a magnesium alloy is used for the first sidewall 162, the second sidewall 164 and the circumferential wall 166 was described. In another embodiment, a material other than a magnesium alloy may be used for the first sidewall 162, the second sidewall 164 and the circumferential wall 166. For example, an aluminum alloy may be used for the first sidewall 162, the second sidewall 164 and the circumferential wall 166.

In the above embodiment, the configuration in which the three pairs of stoppers (the first stopper 110 and the first stopper receiver 210, the second stopper 120 and the second stopper receiver 220, and the third stopper 130 and the third stopper receiver 230) are disposed on the first sidewall 162 and the facing portion 142 was described. In another embodiment, four or more pairs of stoppers may be disposed on the first sidewall 162 and the facing portion 142. In yet another embodiment, only two pair of stoppers may be disposed on the first sidewall 162 and the facing portion 142. In this case, the third stopper 130 and the third stopper receiver 230 may not be disposed and only the first stopper 110 and the first stopper receiver 210, and the second stopper 120 and the second stopper receiver 220 may be disposed.

In the above embodiment, the configuration in which the first stopper 110, the second stopper 120 and the third stopper 130 are formed seamlessly and integrally with the first sidewall 162 was described. In another embodiment, at least one of the first stopper 110, the second stopper 120 and the third stopper 130 may be separate from the first sidewall 162. In this case, a material other than a magnesium alloy, such as an aluminum alloy, may be used for the at least one of the first stopper 110, the second stopper 120 and the third stopper 130 separate from the first sidewall 162.

In the above embodiment, the configuration in which a magnesium alloy is used for the facing portion 142 was described. In another embodiment, a material other than the magnesium alloy may be used for the facing portion 142. For example, an aluminum alloy may be used for the facing portion 142.

In the above embodiment, the configuration in which the first stopper receiver 210, the second stopper receiver 220 and the third stopper receiver 230 are seamlessly and integrally formed with the facing portion 142 was described. In another embodiment, at least one of the first stopper receiver 210, the second stopper receiver 220 and the third stopper receiver 230 may be separate from the facing portion 142. In this case, a material other than a magnesium alloy, such as an aluminum alloy may be used for the at least one of the first stopper receiver 210, the second stopper receiver 220 and the third stopper receiver 230 which is separate from the facing portion 142.

In the above embodiment, the configuration in which, in the state where the first stopper 110 is in contact with the first stopper receiver 210, the angle $\theta 1$ formed by the line connecting the second stopper surface 122 and the pivot axis A and the line connecting the second stopper receiver surface 222 and the pivot axis A is within a range from 0° to 2° was described. In another embodiment, in the state where the first stopper 110 is in contact with the first stopper receiver 210, the angle $\theta 1$ formed by the line connecting the second stopper surface 122 and the pivot axis A and the line connecting the second stopper receiver surface 222 and the pivot axis A may be within a range from 0° to −30° or 0° to −90°.

In the above embodiment, the configuration in which, the second contact position p2 is offset inward from the first contact position p1 in the radial direction of the pivot axis A and the third contact position p3 is offset inward from the first contact position p1 in the radial direction of the pivot axis A and is offset outward from the second contact position p2 in the radial direction of the pivot axis A was described. In another embodiment, the first contact position p1, the second contact position p2 and the third contact position p3 may be in any positional relationships. For example, the first contact position p1 may be offset inward from the second contact position p2 in the radial direction of the pivot axis A, and the third contact position p3 may be offset outward from the second contact position p2 in the radial direction of the pivot axis A.

In the above embodiment, the configuration in which, in the state where the third stopper 130 is in contact with the third stopper receiver 230, the angle $\theta 2$ formed by the line connecting the first stopper surface 112 and the pivot axis A and the line connecting the first contact position p1 and the pivot axis A is 65° was described. In another embodiment, in the state where the third stopper 130 is in contact with the third stopper receiver 230, the angle $\theta 2$ formed by the line connecting the first stopper surface 112 and the pivot axis A and the line connecting the first contact position p1 and the pivot axis A may be other than 65°.

Unlike the above embodiment, the power cutter 10 may further includes a battery pack cover which covers the plurality of battery packs 60 and is configured to open and close. In this case, it is possible to protect the plurality of battery packs 60 from moisture and cutting dust.

Unlike the above embodiment, the power cutter 10 may further include a water supply tank connected to the water supply connector 54. In this case, it is not necessary to attach a hose or the like to the water supply connector 54 to connect with an external water source, thus maneuverability for the user can further be enhanced. Moreover, it is possible to use the power cutter 10 even in a place where water cannot be supplied externally, thus user convenience can also be enhanced.

(Corresponding Relationships)

As described above, in one or more embodiments, the power cutter 10 (an example of the working machine) comprises: the output shaft 85; the rotary blade 12 attached to the output shaft 85; the electric motor 4 (an example of the prime mover) configured to rotate the output shaft 85; the housing 14 that houses the electric motor 4, and rotatably supports the output shaft 85; and the blade cover 16 attached to the housing 14 such that the blade cover 16 is pivotable with respect to the housing 14 about the pivot axis A coincident with the rotation axis of the output shaft 85 (an example of the pivot axis substantially coincident with the rotation axis of the output shaft). The blade cover 16 comprises the first sidewall 162 (an example of the sidewall) covering at least a part of the side surface of the rotary blade 12. The housing 14 comprises the facing portion 142 that faces the right surface of the first sidewall 162 (an example of a side surface of the sidewall that is opposite to a side surface of the sidewall that faces the side surface of the rotary blade). The first sidewall 162 comprises the first stopper 110 and the second stopper 120. The facing portion 142 comprises the first stopper receiver 210 and the second stopper receiver 220. When the blade cover 16 is pivoted in the first direction (an example of a first pivot direction of the blade cover), the first stopper 110 contacts the first stopper receiver 210 at the first contact position p1 from the second direction side (an example of an upstream side of the first pivot direction). When the blade cover 16 is further pivoted in the first direction from the state where the first stopper 110 is in contact with the first stopper receiver 210, the second stopper 120 contacts the second stopper receiver 220 at the second contact position p2 from the second direction side.

According to the above configuration, the first stopper 110 suppresses the blade cover 16 from over-pivoting in the first direction by contacting the first stopper receiver 210. Moreover, according to the above configuration, when the blade cover 16 is further pivoted in the first direction due to, for example, the first stopper receiver 210 riding up on the first stopper 110, the second stopper 120 contacts the second stopper receiver 220. Consequently, over-pivoting of the blade cover 16 in the first direction is suppressed by these two levels of preventive measures. According to the above configuration, over-pivoting of the blade cover 16 can suitably be suppressed.

In one or more embodiments, in the state where the first stopper 110 is in contact with the first stopper receiver 210, the angle $\theta 1$ formed by the line connecting the second stopper 120 and the pivot axis A and the line connecting the second stopper receiver 220 and the pivot axis A is within the range from 0° to 2°.

If the blade cover 16 is pivoted to a great extent between the state where the first stopper 110 is in contact with the first stopper receiver 210 and the state where the second stopper 120 contacts the second stopper receiver 220, over-pivoting of the blade cover may not suitably be suppressed. According to the above configuration, the angle $\theta 1$ formed by the line connecting the second stopper 120 and the pivot axis A and the line connecting the second stopper receiver 220 and the pivot axis A is within the range from 0° to 2°. Consequently, the second stopper 120 contacts the second stopper receiver 220 without the blade cover 16 being pivoted to a great extent from the state in which the first stopper 110 is in contact with the first stopper receiver 210. According to the above configuration, over-pivoting of the blade cover 16 can more suitably be suppressed.

In one or more embodiments, the first contact position p1 and the second contact position p2 are offset from each other in the radial direction of the pivot axis A.

If the first contact position p1 and the second contact position p2 are not offset from each other in the radial direction of the pivot axis A, the first stopper receiver 210 and the second stopper receiver 220 disposed on the facing portion 142 at least partially overlap each other in the circumferential direction of the pivot axis A. According to the above configuration, the first stopper receiver 210 and the second stopper receiver 220 can be arranged without overlapping each other in the circumferential direction of the pivot axis A. Consequently, the facing portion 142 on which the first stopper receiver 210 and the second stopper receiver 220 are disposed can be downsized in the circumferential direction of the pivot axis A.

In one or more embodiments, the first contact position p1 is offset radially outward from the second contact position p2.

In general, the blade cover 16 is attached to the housing 14 at the vicinity of the pivot axis A. In this case, when the first stopper receiver 210 rides up on the first stopper 110, a distance between the facing portion 142 and the first sidewall 162 becomes larger as they are further from the pivot axis A. At this point, there is a possibility that, if the distance between the second stopper 120 and the second stopper receiver 220 becomes larger, the second stopper 120 and the second stopper receiver 220 do not contact each other, by which over-pivoting of the blade cover 16 is not suppressed. According to the above configuration, the second contact position p2 is offset radially inward from the first contact position p1, by which the distance between the second stopper 120 and the second stopper receiver 220 are prevented from becoming larger when the first stopper receiver 210 rides up on the first stopper 110. Consequently, it is ensured that the second stopper 120 contacts the second stopper receiver 220 with greater assurance when the first stopper receiver 210 rides up on the first stopper 110. According to the above configuration, over-pivoting of the blade cover 16 can be suppressed.

In one or more embodiments, the first sidewall 162 further comprises the third stopper 130. The facing portion 142 further comprises the third stopper receiver 230. When the blade cover 16 is pivoted in the second direction, the third stopper 130 contacts the third stopper receiver 230 at the third contact position p3 from the first direction side.

According to the above configuration, the third stopper 130 suppresses the blade cover 16 from over-pivoting in the second direction by contacting the third stopper receiver 230. According to the above configuration, the blade cover 16 can be suppressed not only from over-pivoting in the first direction but also from over-pivoting in the second direction.

In one or more embodiments, the output shaft 85 is configured to be rotated clockwise (an example of a predetermined rotation direction about the rotation axis) when the power cutter 10 is viewed from the right side. The first direction corresponds to the forward rotation direction of the output shaft 85. The second direction corresponds to the reverse rotation direction of the output shaft 85.

For example, as the situation in which torque which is large enough for the first stopper receiver 210 to ride up on the first stopper 110 is generated at the blade cover 16, the situation in which torque of the rotary blade 12 is transmitted to the blade cover 16 via a foreign object that adversely entered between the rotary blade 12 and the blade cover 16 can be contemplated. In this case, torque is generated at the blade cover in the direction pivoting the blade cover 16 in the first direction which corresponds to the forward rotation direction of the rotary blade 12.

According to the above configuration, the first stopper 110 and the second stopper 120 can suppress the blade cover 16 from over-pivoting in the first direction which corresponds to the forward rotation direction of the rotary blade 12 by these two levels of preventive measures. According to the above configuration, when the torque of the rotary blade 12 is transmitted to the blade cover 16, the blade cover 16 can more suitably be suppressed from over-pivoting.

In one or more embodiments, at least one of the first stopper 110, the second stopper 120, and the third stopper 130 is integrated with the first sidewall 162.

During manufacturing processes of the power cutter 10, there is a case in which the number of parts of the blade cover 16 needs to be reduced. According to the above configuration, as compared to the case in which the first stopper 110, the second stopper 120 and the third stopper 130 are separately attached to the first sidewall 162, the number of parts of the blade cover 16 can be reduced.

In one or more embodiments, at least one of the first stopper 110, the second stopper 120, and the third stopper 130 is separate from the first sidewall 162.

In general, when each of the first stopper 110, the second stopper 120 and the third stopper 130 is integrated with the first sidewall 162, the same material used for the first sidewall 162 is used for the first stopper 110, the second stopper 120 and the third stopper 130. Here, there is a case in which the material different from the one used for the first sidewall 162 needs to be used for the first stopper 110, the second stopper 120 and/or the third stopper 130. In the above configuration, at least one of the first stopper 110, the second stopper 120 and the third stopper 130 can be formed using a material different from the one used for the sidewall.

In one or more embodiments, at least one of the first stopper receiver 210, the second stopper receiver 220, and the third stopper receiver 230 is integrated with the facing portion 142.

In manufacturing processes of the power cutter 10, there is a case in which the number of parts of the housing 14 needs to be reduced. According to the above configuration, as compared to the case in which the first stopper receiver 210, the second stopper receiver 220 and the third stopper receiver 230 are separately attached to the facing portion 142, the number of parts of the housing 14 can be reduced.

In one or more embodiments, at least one of the first stopper receiver 210, the second stopper receiver 220, and the third stopper receiver 230 is separate from the facing portion 142.

In general, when each of the first stopper receiver 210, the second stopper receiver 220 and the third stopper receiver 230 is integrated with the facing portion 142, the same material used for the facing portion 142 is used for the first stopper receiver 210, the second stopper receiver 220 and the third stopper receiver 230. Here, there is a case in which the material different from the one used for the facing portion 142 needs to be used for the first stopper receiver 210, the second stopper receiver 220 and/or the third stopper receiver 230. According to the above configuration, at least one of the first stopper receiver 210, the second stopper receiver 220 and the third stopper receiver 230 can be formed using the material different from the one used for the facing portion 142.

In one or more embodiments, the power cutter 10 further includes the output pulley 84 fixed to the output shaft 85; the input shaft 81 rotatably supported by the housing 14; the input pulley 82 fixed to the input shaft 81; and the transmission belt 83 wrapped around the input pulley 82 and the output pulley 84. The electric motor 4 is configured to rotate the output shaft 85 by rotating the input shaft 81.

In the power cutter 10 configured to rotate the rotary blade 12 with relatively large torque among the working machine, it is relatively likely that torque large enough for the first stopper receiver 210 to ride up on the first stopper 110 is generated at the blade cover 16. According to the above configuration, the blade cover 16 can suitably be suppressed from over-pivoting in the power cutter 10.

What is claimed is:

1. A working machine comprising:
    an output shaft;
    a rotary blade attached to the output shaft;
    a prime mover configured to rotate the output shaft;
    a housing that houses the prime mover and rotatably supports the output shaft; and
    a blade cover attached to the housing such that the blade cover is pivotable with respect to the housing about a pivot axis substantially coincident with a rotation axis of the output shaft,
    wherein the blade cover comprises a sidewall covering at least a part of a side surface of the rotary blade,
    the housing comprises a facing portion that faces a side surface of the sidewall that is opposite to a side surface of the sidewall that faces the side surface of the rotary blade,
    the sidewall comprises a first stopper and a second stopper,
    the facing portion comprises a first stopper receiver and a second stopper receiver,
    when the blade cover is pivoted in a first pivot direction of the blade cover, the first stopper contacts the first stopper receiver at a first contact position from an upstream side of the first pivot direction,
    when the blade cover is further pivoted in the first pivot direction from a state where the first stopper is in contact with the first stopper receiver, the second stopper contacts the second stopper receiver at a second contact position from the upstream side of the first pivot direction, and
    in the state where the first stopper is in contact with the first stopper receiver, an angle formed by a line connecting the second stopper and the pivot axis and a line connecting the second stopper receiver and the pivot axis is within a range from 0° to 2°.

2. The working machine according to claim 1, wherein the output shaft is configured to be rotated in a predetermined rotation direction about the rotation axis,
    the first pivot direction corresponds to the predetermined rotation direction of the output shaft, and
    a second pivot direction which is opposite to the first pivot direction corresponds to a reverse rotation direction which is opposite to the predetermined rotation direction of the output shaft.

3. The working machine according to claim 1, wherein the sidewall further comprises a third stopper,
    the facing portion further comprises a third stopper receiver, and
    when the blade cover is pivoted in a second pivot direction which is opposite to the first pivot direction, the third stopper contacts the third stopper receiver at a third contact position from an upstream side of the second pivot direction.

4. The working machine according to claim 3, wherein at least one of the first stopper, the second stopper, and the third stopper is integrated with the sidewall.

5. The working machine according to claim 3, wherein at least one of the first stopper receiver, the second stopper receiver, and the third stopper receiver is integrated with the facing portion.

6. The working machine according to claim 1, further comprising:
    an output pulley fixed to the output shaft;
    an input shaft rotatably supported by the housing;
    an input pulley fixed to the input shaft; and
    a transmission belt wrapped around the input pulley and the output pulley,
    wherein the prime mover is configured to rotate the output shaft by rotating the input shaft, and
    the working machine works as a power cutter.

7. The working machine according to claim 1, wherein the first contact position and the second contact position are offset from each other in a radial direction of the pivot axis,
    the first contact position is offset radially outward from the second contact position,
    the sidewall further comprises a third stopper,
    the facing portion further comprises a third stopper receiver,
    when the blade cover is pivoted in a second pivot direction which is opposite to the first pivot direction, the third stopper contacts the third stopper receiver at a third contact position from an upstream side of the second pivot direction,
    the output shaft is configured to be rotated in a predetermined rotation direction about the rotation axis,
    the first pivot direction corresponds to the predetermined rotation direction of the output shaft,
    the second pivot direction corresponds to a reverse rotation direction which is opposite to the predetermined rotation direction of the output shaft,
    at least one of the first stopper, the second stopper, and the third stopper is integrated with the sidewall,
    at least one of the first stopper receiver, the second stopper receiver, and the third stopper receiver is integrated with the facing portion,
    the working machine further comprises:
        an output pulley fixed to the output shaft;
        an input shaft rotatably supported by the housing;
        an input pulley fixed to the input shaft; and
        a transmission belt wrapped around the input pulley and the output pulley,
    the prime mover is configured to rotate the output shaft by rotating the input shaft, and
    the working machine works as a power cutter.

8. The working machine according to claim 1, wherein the first contact position and the second contact position are offset from each other in a radial direction of the pivot axis,
    the first contact position is offset radially outward from the second contact position,
    the sidewall further comprises a third stopper,
    the facing portion further comprises a third stopper receiver,
    when the blade cover is pivoted in a second pivot direction which is opposite to the first pivot direction, the third stopper contacts the third stopper receiver at a third contact position from an upstream side of the second pivot direction,
    the output shaft is configured to be rotated in a predetermined rotation direction about the rotation axis, the first pivot direction corresponds to the predetermined rotation direction of the output shaft, the second pivot direction corresponds to a reverse rotation direction which is opposite to the predetermined rotation direction of the output shaft, at least one of the first stopper, the second stopper, and the third stopper is separate from the sidewall, at least one of the first stopper receiver, the second stopper receiver, and the third stopper receiver is separate from the facing portion, the working machine further comprises:
an output pulley fixed to the output shaft;
an input shaft rotatably supported by the housing;
an input pulley fixed to the input shaft; and
a transmission belt wrapped around the input pulley and the output pulley, the prime mover is configured to rotate the output shaft by rotating the input shaft, and the working machine works as a power cutter.

9. A working machine comprising:
an output shaft;
a rotary blade attached to the output shaft;
a prime mover configured to rotate the output shaft;
a housing that houses the prime mover and rotatably supports the output shaft; and
a blade cover attached to the housing such that the blade cover is pivotable with respect to the housing about a pivot axis substantially coincident with a rotation axis of the output shaft, wherein the blade cover comprises a sidewall covering at least a part of a side surface of the rotary blade, the housing comprises a facing portion that faces a side surface of the sidewall that is opposite to a side surface of the sidewall that faces the side surface of the rotary blade, the sidewall comprises a first stopper and a second stopper, the facing portion comprises a first stopper receiver and a second stopper receiver, when the blade cover is pivoted in a first pivot direction of the blade cover, the first stopper contacts the first stopper receiver at a first contact position from an upstream side of the first pivot direction, when the blade cover is further pivoted in the first pivot direction from a state where the first stopper is in contact with the first stopper receiver, the second stopper contacts the second stopper receiver at a second contact position from the upstream side of the first pivot direction, the first contact position and the second contact position are offset from each other in a radial direction of the pivot axis, and the first contact position is offset radially outward from the second contact position.

10. The working machine according to claim 9, wherein the output shaft is configured to be rotated in a predetermined rotation direction about the rotation axis, the first pivot direction corresponds to the predetermined rotation direction of the output shaft, and a second pivot direction which is opposite to the first pivot direction corresponds to a reverse rotation direction which is opposite to the predetermined rotation direction of the output shaft.

11. The working machine according to claim 9, wherein the sidewall further comprises a third stopper, the facing portion further comprises a third stopper receiver, and when the blade cover is pivoted in a second pivot direction which is opposite to the first pivot direction, the third stopper contacts the third stopper receiver at a third contact position from an upstream side of the second pivot direction.

12. The working machine according to claim 11, wherein at least one of the first stopper, the second stopper, and the third stopper is integrated with the sidewall.

13. The working machine according to claim 11, wherein at least one of the first stopper receiver, the second stopper receiver, and the third stopper receiver is integrated with the facing portion.

14. The working machine according to claim 9, further comprising:
an output pulley fixed to the output shaft;
an input shaft rotatably supported by the housing;
an input pulley fixed to the input shaft; and
a transmission belt wrapped around the input pulley and the output pulley, wherein the prime mover is configured to rotate the output shaft by rotating the input shaft, and the working machine works as a power cutter.

* * * * *